(12) United States Patent
Dehaudt et al.

(10) Patent No.: US 6,221,286 B1
(45) Date of Patent: Apr. 24, 2001

(54) NUCLEAR FUEL HAVING IMPROVED FISSION PRODUCT RETENTION PROPERTIES

(75) Inventors: Philippe Dehaudt, Eybens; Véronique Peres, Romans, both of (FR)

(73) Assignee: Framatome, Courbevoie (FR)

( * ) Notice: Subject to any disclaimer, the term of this patent is extended or adjusted under 35 U.S.C. 154(b) by 0 days.

(21) Appl. No.: 09/409,883

(22) Filed: Oct. 1, 1999

Related U.S. Application Data

(62) Division of application No. 08/553,372, filed on Aug. 9, 1996, now Pat. No. 5,999,585.

(51) Int. Cl.⁷ .................................................. G21C 21/00
(52) U.S. Cl. ............................................. 264/0.5; 419/19
(58) Field of Search ................................ 264/0.5; 419/19

(56) References Cited

U.S. PATENT DOCUMENTS

| | | | |
|---|---|---|---|
| 3,170,847 | 2/1965 | Dudek et al. | 376/421 |
| 3,228,885 * | 1/1966 | Barta et al. | 252/460 |
| 3,258,333 * | 6/1966 | Aubert | 376/421 X |
| 3,331,748 | 7/1967 | Feraday | 376/422 |
| 3,347,749 | 10/1967 | Jordan | 376/422 |
| 3,347,750 | 10/1967 | Thomas | 376/421 |
| 3,350,274 | 10/1967 | Higatsberger | 376/421 |
| 3,475,340 * | 10/1969 | Pollock | 376/420 |
| 3,545,966 * | 12/1970 | Columbie et al. | 376/421 X |
| 3,759,787 | 9/1973 | McDonald | 376/421 |
| 3,845,177 | 10/1974 | Burnett | 376/421 |
| 4,430,276 * | 2/1984 | Radford et al. | 264/0.5 |
| 4,460,522 * | 7/1984 | Kinugasa et al. | 264/0.5 |
| 4,522,769 * | 6/1985 | Connolly, Jr. et al. | 264/0.5 |
| 4,571,315 * | 2/1986 | Gerontopoulos et al. | 264/0.5 |
| 4,617,158 * | 10/1986 | Braun et al. | 264/0.5 |
| 4,774,051 * | 9/1988 | Peehs et al. | 376/419 |
| 4,882,100 * | 11/1989 | Yato et al. | 264/0.5 |
| 5,257,298 * | 10/1993 | Yuda et al. | 376/421 |
| 5,596,615 | 1/1997 | Nakamura et al. | 376/420 |
| 5,841,200 * | 11/1998 | Bauer et al. | 264/0.5 |

OTHER PUBLICATIONS

Bakker, et al, *Using Radially Homogeneously Enriched $UO_2$ Fuel to Reduce The Rim Effect*, Proc. of 1997 Topical Meeting on LWR Performance, American Nuc. Soc. Inc., Mar. 2–6, 1997.

* cited by examiner

*Primary Examiner*—Daniel J. Jenkins
(74) *Attorney, Agent, or Firm*—Pollock, Vande Sande & Amernick, R.L.L.P.

(57) ABSTRACT

A nuclear fuel based on $UO_2$, $ThO_2$ and/or $PuO_2$ having improved retention properties for fission products. The fuel comprises a metal such as Cr or Mo able to trap oxygen in order to form an oxide having a free formation enthalpy equal to or below that of the superstoichiometric oxide or oxides $(U, Th)O_{2+x}$ and/or $(U, Pu)O_{2+x}$ ($0<x\leq0.01$). Thus, it is possible to trap oxygen atoms released during the fission of U, Th and/or Pu. This leads to an increase in the retention level of the fission products and a possibility of obtaining a high burn-up of nuclear fuel elements.

25 Claims, 4 Drawing Sheets

NUCLEAR FUEL HAVING IMPROVED FISSION PRODUCT RETENTION PROPERTIES

CROSS REFERENCE TO RELATED APPLICATIONS

The present application is a divisional application of U.S. application Ser. No. 08/553,372, filed Aug. 9, 1996; now U.S. Pat. No. 5,999,585, a continuing prosecution application of which was filed Aug. 9, 1996, and which was allowed Aug. 9, 1999.

The present invention relates to nuclear fuels based on UO, ThO$_2$ and/or PuO having improved fission product retention properties.

BACKGROUND OF THE INVENTION

In the use of nuclear fuels based on oxide, particularly uranium oxide, one of the problems caused is due to the release of fission gases in the element during the operation of the reactor, because these fission products must be kept in the fuel element, particularly in the actual fuel pellets, so as to limit the internal pressure of the sheaths or cans and the interaction of the fission products with the latter.

Therefore, at present, the burn-up of nuclear elements is limited to 50 GWj/t of U in order not to exceed the threshold beyond which the release of fission gases becomes significant.

However, operators of electronuclear reactors, particularly pressurized water reactors (PWR) wish to optimize control of the nuclear fuel by increasing burn-up of the uranium dioxide pellets contained in the rods in order to achieve minimum values of 60 to 70 GWj/tU.

Research carried out up to now for obtaining such an improvement has used procedures for increasing the size of the uranium dioxide grains, because ii: has been found that the gas quantity released by an irradiated large grain fuel is less than that released by an irradiated small grain fuel. Use has also been made of procedures for forming precipitates in the nuclear fuel in order to anchor the fission gases on said precipitates.

In order to obtain an increase in the size of the uranium dioxide grains, it is possible to add additives such as iO, Nb O, Cr O, Al O, V O and MgO to the uranium dioxide powder subject to fritting or sintering in order to activate its crystal growth, provided that the sintering takes place under a wet hydrogen atmosphere so that the added oxide quantity remains in solution in the uranium dioxide and is not reduced to a metallic element. The use of such additives for obtaining a large grain microstructure is, e.g. described by Killeen in Journal of Nuclear Materials, 88, 1980, pp 177–184, Sawbridge et al in Report CEGB RD/B/N 4866, July 1980 and Radford et al in Scientific Paper 81-7D2-PTFOR-P2, 1981. However, the use of certain additives of this type can lead to an increase in the diffusion coefficients of cations and fission gases in the uranium dioxide, which is unfavorable for the retention of the fission products and does not make it possible to take full advantage of the large grain microstructure.

Another procedure for improving the retention rate of nuclear fuels consists of dispersing in the uranium dioxide grains nanoprecipitates of a second phase for ensuring the anchoring of the fission products on such second phase. Nanoprecipitates of this type can consist of magnesium oxide inclusions, as described by Sawbridge et al in Journal of Nuclear Materials, 95, 1980, pp 119–128 and in FR-A-2 026 251.

SUMMARY OF THE INVENTION

The present invention makes use of a method different from that described hereinbefore for improving the retention rate of fission products in a nuclear fuel. This method consists of trapping the oxygen atoms released by the fission of the uranium and/or plutonium atoms, so as to maintain the O/U (Th, Pu) or O/M stoichiometry with M=U+Pu or U+Th or U+Pu+Th of the fuel at 2 and thus prevent a rise in the diffusion coeffients in the fuel and a reduction of its thermal conductivity, the increase in the diffusion coefficients is a mechanism leading to the accumulation of fission products at the grain boundaries, followed by release of the fission products. In the same way, a reduction of the thermal conductivity of the fuel is prejudicial, because it has the effect of increasing the temperature of the fuel for the same linear power and consequently both reducing the solubility of the fission products and favoring their diffusion.

The invention also relates to a process for improving the retention of fission products within a ceramic nuclear fuel based on UO$_2$, ThO$_2$ and/or PuO$_2$, which consists of including in the ceramic nuclear fuel at least one metal able to trap oxygen by forming an oxide having a free formation enthalpy at the operating temperature T of the nuclear reactor below the free formation enthalpy at the same temperature T of the superstoichiometric oxide or oxides of formulas (U, Th)O$_{2+x}$ and/or (U, Pu)O$_{2+x}$ in which x is such that $0<x\leq0.01$.

The use of such a metallic additive consequently makes it possible to maintain the O/U (Th or Pu) or O/M ratio defined hereinbefore of the nuclear fuel at a value of 2 and in this a way to avoid an increase in the diffusion coefficients, which remain at a low value, and a reduction in the thermal conductivity of the fuel. Thus, a high fission product retention rate is obtained.

This procedure can be combined with known methods of increasing the size of the UO$_2$ and/or PuO$_2$ and/or ThO$_2$ grains and forming precipitates for anchoring the fission gases, which is very interesting and makes it possible to improve the performance characteristics of the fuel.

In the case of uranium dioxide-based fuels, the free formation enthalpy of the superstoichiometric oxide UO$_{2+x}$ with $0<x\leq0.01$ can be expressed in oxygen potential and calculated on the basis of the law of Lindemer and Besmann, as described in Journal of Nuclear Materials, 130, 1985, pp 473–488. In this case and as is indicated on p 480 thereof, the oxygen potential $\Delta G(O_2)$ of the above-defined superstoichiometric oxide can be expressed in J/mole according to the following formula:

$$-360\,000+214\,T+4\,RTLn[2x(1-2x)/(1-4x)^2]$$

in which R is the molar constant of the gases, T is the temperature in Kelvins and x is as defined hereinbefore.

Moreover, for uranium dioxide-based fuels, the metal included in the fuel must be able to form an oxide having an oxygen potential defined by the formula: $\Delta G(O_2)=RT\,Ln(pO_2)$ in which R is the molar constant of the gases, T the reactor operating temperature and $p(O_2)$ the partial oxygen pressure, equal to or below the above-estimated value for UO$_{2+x}$ in accordance with the Lindemer and Besmann law. Examples of suitable metals are Cr, Mo, Ti, Nb and U.

The invention also relates to a fuel for nuclear reactors comprising a ceramic material based on UO$_2$, ThO$_2$ and/or PuO$_2$ in which is dispersed at least one metal able to trap oxygen and having the characteristics given hereinbefore.

According to the invention, the oxide-based ceramic material can be constituted by UO$_2$, ThO$_2$ PuO$_2$ or mixtures thereof, the mixed oxide $UO_2$—$PuO_2$ or $UO_2$—$ThO_2$, mixed oxides based on $UO_2$ and other oxides such as oxides of rare earths or mixed oxides based on $PuO_2$.

Preferably, the ceramic material is based on $UO_2$ and the dispersed metal is able to form an oxide having an oxygen potential below the oxygen potential of $UO_{2+x}$, as described herinbefore.

In general, to obtain a burn-up of 60 $GWj/t^{-1}$: the dispersed metal represents 0.1 to 2% by weight of the fuel material. Preferably, the metal is chromium and represents 0.1 to 1 or better still 0.2 to 0.5% by weight of the fuel material.

Moreover, the fuel material can also comprise additives such as $TiO_2$, $Nb_2O_5$, $Cr_2O_3$, $Al_2O_3$, $V_2O_5$ and MgO, in order to increase the size of the fuel grains and/or aid the anchoring of the fission products, as well as other additives, e.g., $SiO_2$, in order to improve other properties.

The fuel material according to the invention can be prepared by conventional sintering or fritting processes by adding to the ceramic material powder to be sintered the metal, either in metallic form, or in the form of an oxide or oxygenated compound.

In the first case, after shaping the powder by cold compression, sintering is carried out in a dry hydrogen atmosphere e.g. having a water content below 0.05 volume % so as not to oxidize the metal.

In the second case, if it is wished to simultaneously obtain a size increase of the $UO_2$, $ThO_2$ and/or $PuO_2$ grains, use is made of an oxide or oxygenated compound quantity which may or may not exceed the solubility limit of the oxide or oxygenated compound in $UO_2$, $ThO_2$ and/or $PuO_2$ at the sintering temperature and after, shaping the powder by cold compression, sintering takes place under wet or humidified hydrogen, e.g. having a water content above 1 volume %, in order to preserve the oxide during sintering and activate crystal growth. After sintering, the sintered material undergoes a reduction treatment under dry hydrogen, e.g. having a water content below 0.05 volume %, in order to reduce the oxide or oxygenated compound to metal.

In the second case, this manner of operating makes it possible to obtain a large grain microstructure (diameter>40 $\mu$m) with:
either intragranular, nanometric metallic precipitates (diameter<100 nm) if the added oxide or oxygenated compound quantity is below the solubility limit,
or intragranular, nanometric metallic precipitates (diameter<100 nm) and micrometric, metallic precipitates (diameter >0.3 $\mu$m) if the added oxide or oxygenated compound quantity exceeds the solubility limit.

However, if in the second case it is not wished to simultaneously obtain a large grain structure following the shaping of the powder by cold compression, sintering takes place under a dry hydrogen atmosphere, e.g., having a water content below 0.05 volume %, in order to simultaneously reduce the oxide or oxygenated compound to metal. In this case, intragranular, micrometric, metallic precipitates are obtained (diameter>0.3 $\mu$m).

In all these cases, the shaping of the powder by cold compression, e.g., in order to form pellets, can be carried out in a conventional manner by uniaxial compression, e.g., under pressures of 200 to 700 MPa.

A temperature of 1600 to 1750° C. is normally used for sintering.

When there is a supplementary reduction heat treatment, the latter can be carried out at temperatures of 1300 to 1750° C.

The ceramic material powder including the metallic additive in the from of an oxide or oxygenated compound can be prepared by mixing powders of the constituents or by atomization-drying processes using a slip containing the additive in the form of salt in solution, or by coprecipitation of a uranium salt and a salt of the additive.

Therefore the process of the invention, makes it possible to take advantage not only of the oxygen trapping capacity of the added metal, but also, the properties of the metallic oxides in order to activate the $UO_2$ crystal growth and improve the retention of fission products within the fuel.

BRIEF DESCRIPTION OF THE DRAWING

Other features and advantages of the invention can be gathered from the following description and with reference to the attached drawings, to.

DESCRIPTION OF PREFERRED EMBODIMENT

Figure 1:
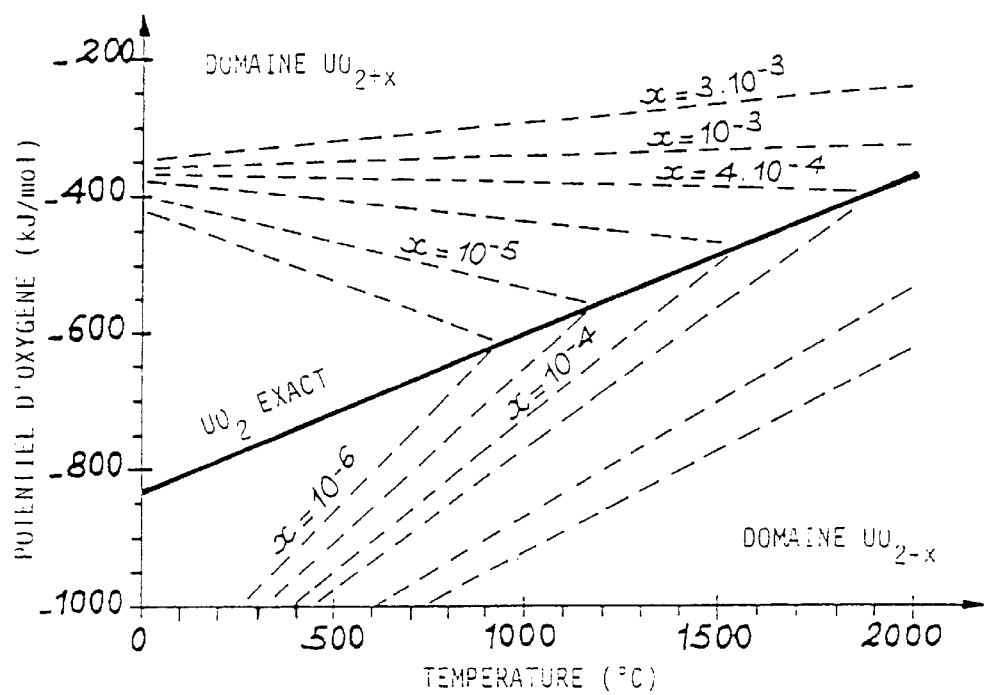
FIGS. 1, 2 & 3 are graphs illustrating the evolution of the oxide potentials of various oxygenated compounds (in kJ/mole) as a function of the temperature (in ° C.)

FIG. 1 shows the oxygen potential in kJ/mole calculated on the basis of the Lindemer and Besmann formula for $UO_2$, as well as for superstoichiometric oxides $UO_{2+x}$ and substoichiometric oxides $UO_{2-x}$ as a function of the temperature in ° C.

Figure 2:
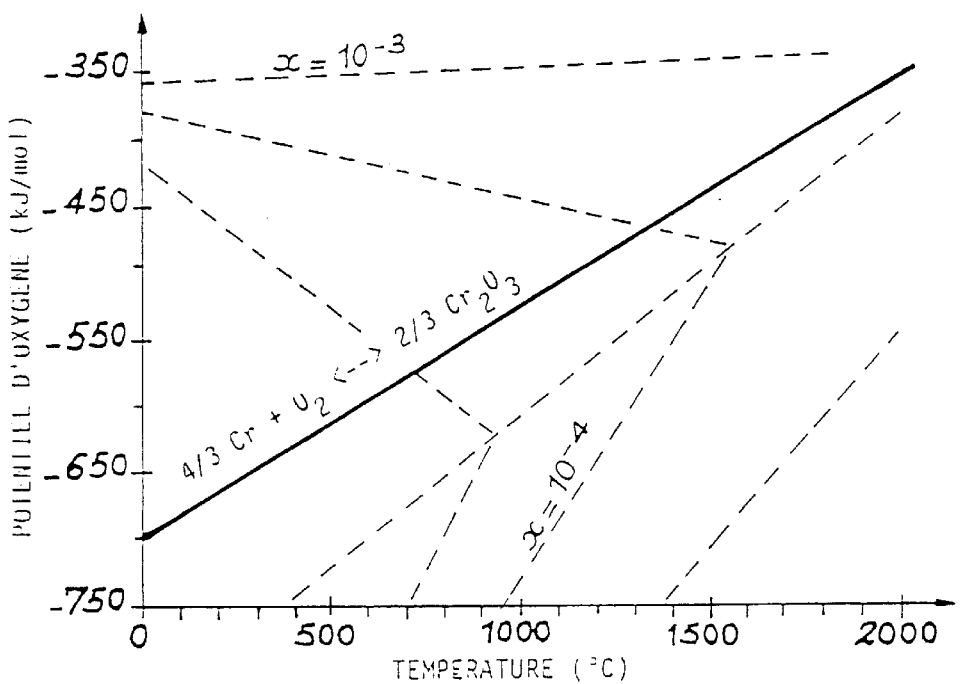

FIG. 2 shows the evolution of the oxygen potential (in kJ/mole) for the $Cr/Cr_2O_3$ pair as a function of the temperature (in ° C.) and it can be seen that, throughout the temperature range in question, the oxygen potential of the oxide is below that of the superstoichiometric oxides $UO_{2+x}$ of FIG. 1

Figure 3:
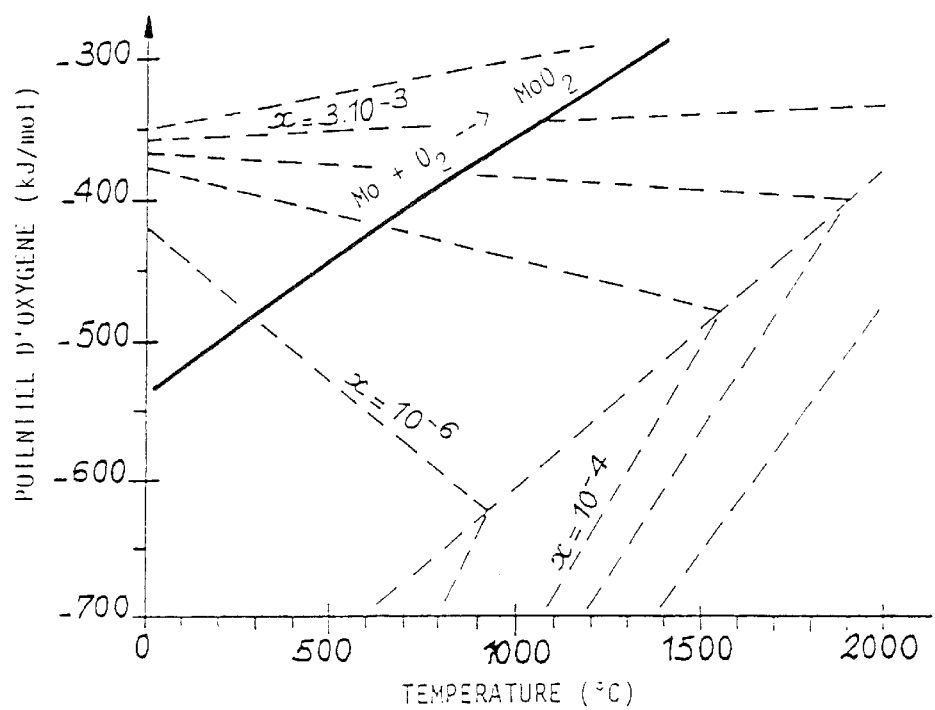

FIG. 3 shows the evolution of the oxygen potential (in kJ/mole) for $MoO_2$ as a function of the temperature and it can be seen that it is still below that of the superstoichiometric oxides $UO_{2+x}$ at the same temperatures.

Consequently these two elements are suitable as a metal able to trap oxygen for fuel materials based on $UO_2$ and the following examples illustrate the use of the two elements with $UO_2$. In all the examples, use is made of a $UO_2$ powder with an average grain size of 0.5 to 100 $\mu$m.

EXAMPLE 1

In this example preparation takes place of $UO_2$ pellets incorporating micrometric, metallic precipitates of Cr.

100 g of $UO_2$ powder are mixed together with 0.1 g of metallic Cr powder having an average grain size below 2 $\mu$m and then the mixture is brought into pellet form by uniaxial compression at 350 Mpa, the matrix being lubricated in a hydraulic press. The pellets are then placed in a molybdenum boat and sintered at 1700° C. for 4 h under dry hydrogen. This gives a small $UO_2$ grain microstructure with micrometric, metallic precipitates of Cr.

Figure 4:
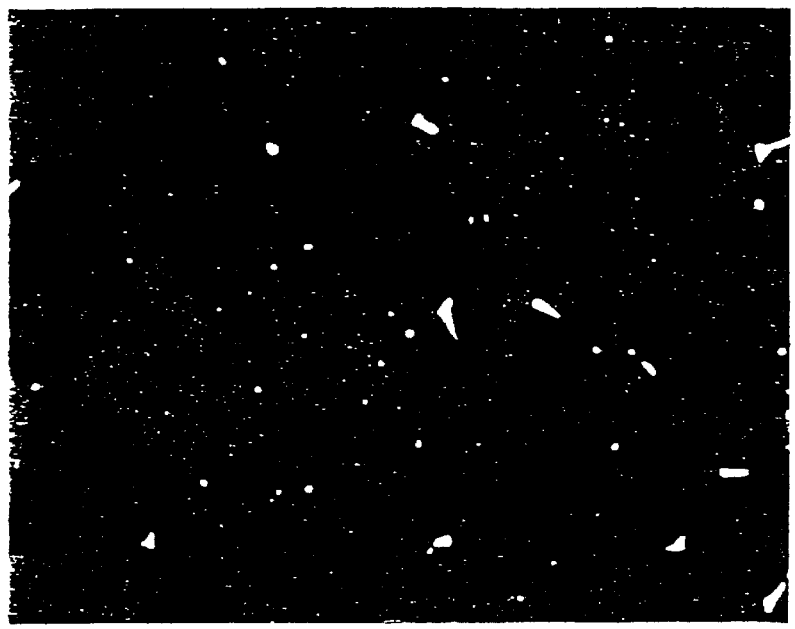
FIG. 4 is a micrograph of a fuel material according to the invention.

FIG. 4 is a micrograph illustrating this structure with a 600× magnification. It is clearly possible to see the intergranular or intragranular metallic precipitates (white particles), and the electron diffraction pattern confirms the metallic character of these inclusions.

In order to verify the behavior of said fuel for trapping oxygen, a managed oxidation takes place of the pellets by heat treatment at 700° C. in a helium atmosphere having 0.01 vol % oxygen, under conditions making it possible to achieve in the case of pure oxide an average O/U ratio of 2.024.

Figure 5:
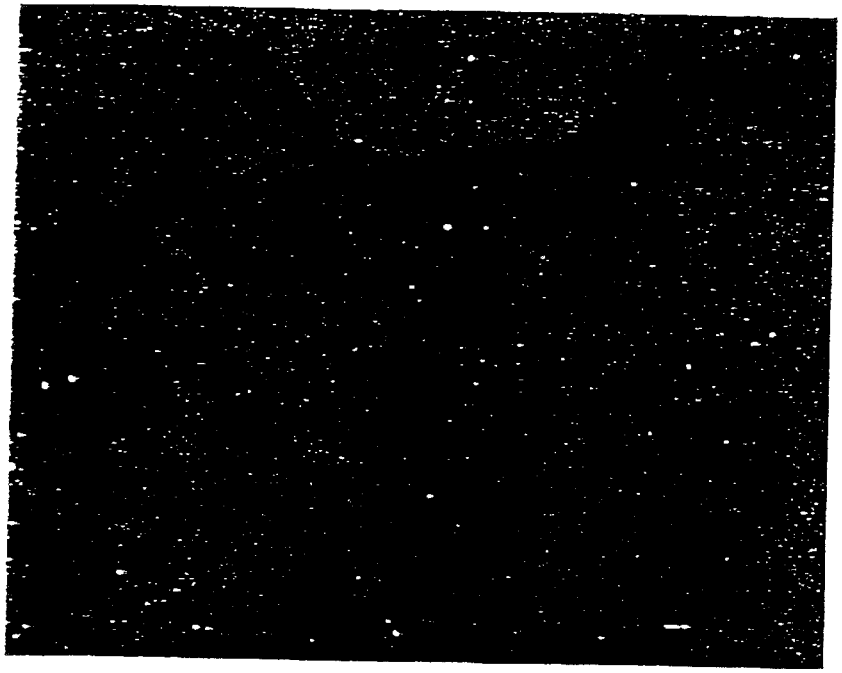
FIG. 5 is a micrograph illustrating oxygen trapping in a fuel material according to the invention.

FIG. 5 is a micrograph with a 400× magnification illustrating the structure of the fuel material having undergone the oxidation. It can be seen that the fuel material has trapped the oxygen and has no phases other than the previously obtained $UO_2$ matrix.

Figure 6:
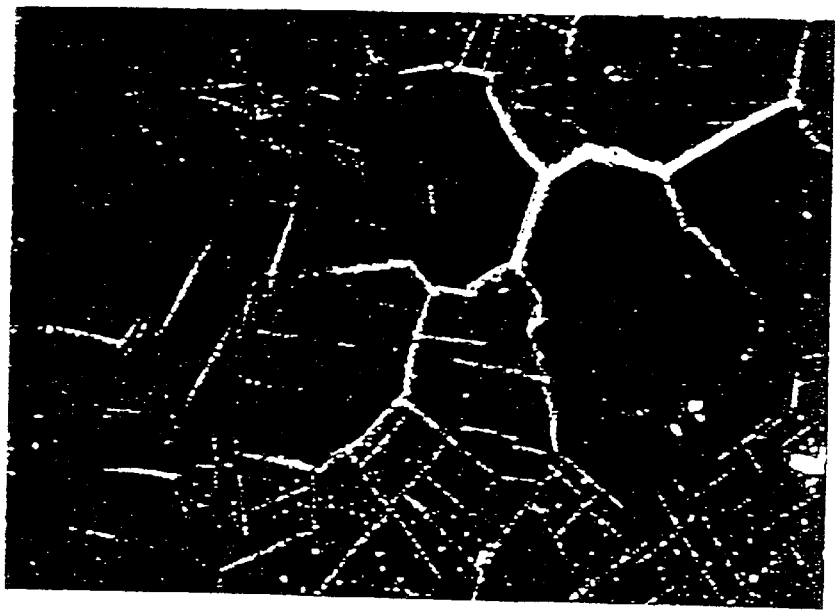
FIG. 6 is a micrograph given for comparison purposes in order to show the structure of a prior art fuel material following managed oxidation.

For comparison purposes, FIG. 6 shows the micrograph of a uranium dioxide pellet obtained under the same conditions as in example 1, but without any chromium addition and when it has undergone the same managed oxidation for obtaining the average O/U ratio of 2.024. FIG. 6 shows that there are $U_4O_9$ needles in the $UO_2$ matrix.

Thus, by comparing FIGS. 5 and 6, it is possible to see the effectiveness of the metallic chromium inclusions, which have prevented the transformation of $UO_2$ into $U_4O_9$.

EXAMPLE 2

In this example preparation takes place of uranium dioxide nuclear fuel pellets having a small $UO_2$ grain microstructure with micrometric, metallic Cr precipitates.

In this case 100 g of $UO_2$ powder are mixed with 0.15 g of $Cr_2O_3$ powder (with a grain size below 2 μm), followed by the formation of pellets from the mixture and they are sintered as example 1, under a dry hydrogen atmosphere.

Figure 7:
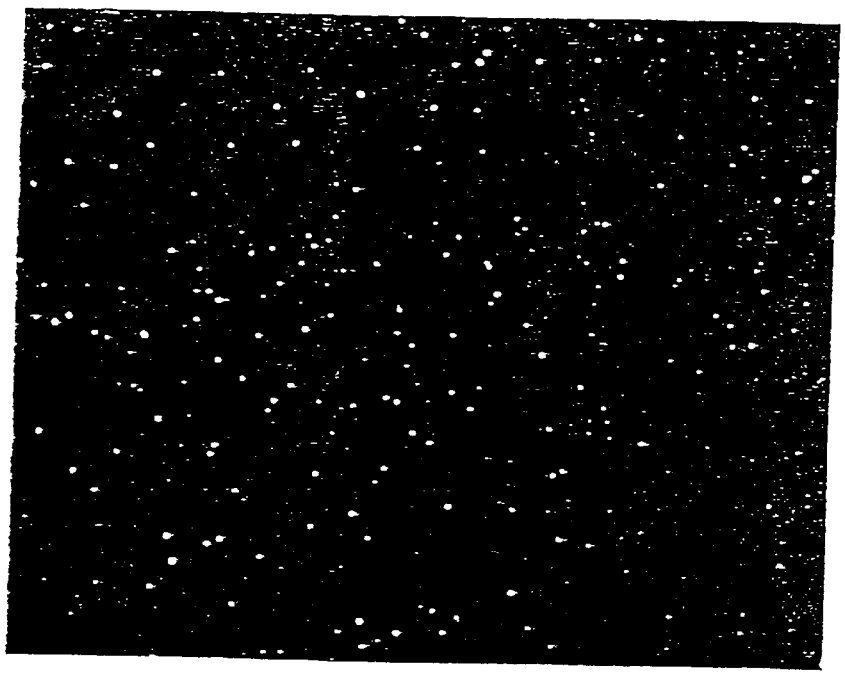
FIG. 7 is a micrograph of a fuel material according to the invention having a small grain structure.

In this case, the added chromium oxide is reduced to metallic chromium during the sintering under dry hydrogen and has not activated the crystal growth of $UO_2$ in order to form a large grain microstructure. Thus, a small grain microstructure is obtained with metallic Cr precipitates. FIG. 7 shows this structure.

EXAMPLE 3

In this Example preparation takes place of a nuclear fuel having a $UO_2$ small grain microstructure with metallic Cr precipitates.

Preparation takes place of a powder by the atomization-drying of a slip containing 150 g of $UO_2$, 0.6 g of a soluble chromium salt: $(NH_4) CrO_4$ and 250 g of distilled water. The powder obtained is then calcined for 2 h in an alumina boat at 400° C. in an alumina laboratory tubular furnace under an argon flow (300 ml/min) in order to transform the chromium salt into $Cr_2O_3$. This is followed by the shaping of the powder and sintering, as in example 1, under a dry hydrogen atmosphere.

In this case, the oxygenated compound of the chromium is reduced during sintering into metallic chromium, so that it cannot serve as an activator for $UO_2$ crystal growth. Thus, a $UO_2$ small grain microstructure is obtained with metallic chromium precipitates.

EXAMPLE 4

In this example preparation takes place of a nuclear fuel having a $UO_2$ large grain microstructure with nanometric, micrometric, metallic precipitates of Cr.

A powder is prepared by atomization-drying, as in Example 3, using 1.5 g of $(NH_4)_2CrO_4$, i.e. a $Cr_2O_3$ content above the $Cr_2O_3$ solubility limit in $UO_2$ at 1700° C. The powder obtained is treated in accordance with Example 3, being calcined for 2 h in an alumina boat at 400° C. in an alumina laboratory tube furnace under an argon flow (300 ml/min). It is then brought into the form of pellets by uniaxial compression at 350 MPa, as in Example 1. Sintering then takes place under a hydrogen atmosphere humidified with 1.7 vol. % water, at 1700° C. and for 4 h in order to keep the chromium in oxide form and assist the increase in the $UO_2$ grain size.

After sintering, an annealing treatment takes place at 1300° C. for 5 h and under dry hydrogen having a water content below 0.05 vol. % in order to reduce the $Cr_2O_3$ oxide into metallic chromium. Maintaining the $Cr_2O_3$ in oxide form during sintering has made it possible to use it as an activator for crystal growth and in this way obtain a large grain microstructure and the annealing treatment under dry hydrogen has then made it possible to reduce $Cr_2O_3$ into metallic chromium and consequently obtain nanometric , micrometric, metallic precipitates.

Figure 8:
FIG. 8 is a micrograph of a fuel material according to the invention, having a large grain microstructure.

The microstructure of the material obtained under these conditions is illustrated in FIG. 8, where it is possible to see the large grains 1 of $UO_2$ and the micrometric chromium inclusions 5. The nanometric chromium inclusions are revealed by electron diffraction.

EXAMPLE 5

A powder is prepared as in example 3 by atomization-drying, but using 0.2 g of $(NH_4) CrO_4$, i e. a $Cr_2O_3$ equivalent content below the solubility limit of $Cr_2O_3$ in $UO_2$ at 1700° C. This is followed by the compression of the powder in the form of pellets and sintering as in Example 4 to obtain a large grain microstructure due to the maintaining of the chromium in oxide form. This is followed by an annealing treatment as in example 4 for reducing $Cr_2O_3$ into metallic chromium.

In this case, a large grain $UO_2$ microstructure is obtained with nanometric metallic precipitates of Cr, because there was no $Cr_2O_3$ excess for forming metallic, micrometric precipitates during the reduction.

EXAMPLE 6

This Example adopts the same operating procedure as in example 4, but use is made of 1.5 g of $(NH_4)_2CrO_4$ and 0.04 g of ultrafine $SiO_2$ in slip containing 150 g of $UO_2$ and 250 g of distilled water. The powder obtained by atomization-drying is compressed in pellet form and then sintered in a humidified hydrogen atmosphere and subjected to an annealing treatment under dry hydrogen, under the same conditions as in example 4. This gives a large grain $UO_2$ microstructure with metallic chromium precipitates and a silica phase at the grain boundaries.

EXAMPLE 7

In this Example a mixture of 100 g of $UO_2$ and 0.6 g of $MoO_3$ is prepared by cogrinding in a metallic uranium ball jar, followed by the compression of the powder mixture to pellet form and sintering under the same conditions as in example 1.

In this case, the molybdenum oxide is reduced to molybdenum during sintering and it is not possible to active the crystal growth of the $UO_2$ grains. Thus, a small grain $UO_2$ microstructure is obtained with micrometric, metallic precipitates of Mo.

EXAMPLE 8

A powder is obtained by atomization-drying of an aqueous suspension constituted by 150 g of $UO_2$ and 7.7 g of ammonium heptamolybdate $(NH_4)_6Mo_7O_{24}$, $4H_2O$ and 250 g of distilled water. The powder is then treated as in Example 1. This gives a small grain $UO_2$ microstructure with micrometric, metallic Mo precipitates.

What is claimed is:

1. A process for the preparation of a nuclear fuel material comprising a ceramic material based on $UO_2$, $ThO_2$ and/or $PuO_2$ in which is dispersed at least one metal able to trap oxygen by forming an oxide, whose free formation enthalpy is equal to or below the free formation enthalpy of the superstoichiometric oxide $(U, Th)O_{2+x}$ and/or $(U,Pu)O_{2+x}$ with x such that $0<x\leq0.01$ at the temperature reached in the nuclear reactor, wherein a mixture of the ceramic material powder and the metal able to trap the oxygen is prepared, the mixture is shaped by cold compression and the thus shaped powder is sintered under a dry hydrogen atmosphere.

2. The process according to claim 1, wherein the ceramic powder is a $UO_2$ powder.

3. The process according to claim 2, wherein the sintering takes place at a temperature of 600 to 1750° C.

4. The process according to claim 1, wherein the metal is able to form an oxide having an oxygen potential defined by the formula:

$$\Delta G(O_2) = RTLn(pO_2)$$

in which R is the molar constant of the gases, T is the nuclear reactor temperature in Kelvins and $pO_2$ is the partial oxygen pressure equal to or below:

$$360\ 000 + 214\ T + 4\ RTLn\ (2x(1-2x)/(1-4x)^2]$$

in which R and T have the meanings given hereinbefore and x is such that $0<x\leq0.01$.

5. A process for the preparation of a nuclear fuel material comprising a ceramic material based on $UO_2$, $ThO_2$ and/or $PuO_2$ in which is dispersed at least one metal able to trap oxygen by forming an oxide, whose free formation enthalpy is equal to or below the free formation enthalpy of the superstoichiometric oxide $(U, Th)O_{22+x}$ and/or $(U, Pu)O_{22+x}$ with x such that $Ox<x\leq0.01$ at the temperature reached in the nuclear reactor, wherein a mixture of the powder of the ceramic material and an oxide or an oxygenated compound of the metal able to trap the oxygen is prepared, the powder is shaped by cold compression, the powder is sintered under a wet hydrogen atmosphere in order to conserve the oxide or oxygenated compounds and a thermal reduction treatment under a dry hydrogen atmosphere is carried out for reducing the oxide or oxygenated compound into metal.

6. The process according to claim 5, wherein the ceramic material power is a $UO_2$ powder.

7. The process according to claim 6, wherein the sintering takes place at a temperature of 600 to 1750° C.

8. The process according to claim 5, wherein the heat treatment takes place at a temperature of 1300 to 1750° C.

9. The process according to claim 5, wherein the oxygenated compound of the metal is an ammonium chromate or an ammonium heptamolybdate.

10. The process according to claim 5, wherein the metal is chosen from the group consisting of Cr, Mo, Ti, Nb and U.

11. The process according to claim 10, wherein the metal is Cr and the Cr content of the fuel material is 0.1 to 1% by weight.

12. The process according to claim 11, wherein the chromium content is 0.2 to 0.5% by weight.

13. The process according to claim 5, wherein the ceramic material is a mixed oxide of $UO_2$ and a rare earth oxide.

14. The process according to claim 5, wherein the metal is chosen from the group consisting of Cr, Mo, Ti, Nb and U.

15. The process according to claim 14, wherein the metal is Cr and the Cr content of the fuel material is 0.1 to 1% by weight.

16. The process according to claim 15, wherein the chromium content is 0.2 to 0.5% by weight.

17. A process for the preparation of a nuclear fuel material comprising a ceramic material based on $UO_2$, $ThO_2$ and/or $PuO_2$ in which is dispersed at least one metal able to trap oxygen by forming an oxide, whose free formation enthalpy is equal to or below the free formation enthalpy of the superstoichiometric oxide $(U, Th)O_{2+x}$ and/or $(U, Pu)O_{2+x}$ with x such that $O<x\leq0.01$ at the temperature reached in the nuclear reactor, wherein a mixture of a ceramic material powder and an oxide or an oxygenated compound of the metal able to trap the oxygen is prepared, the powder is shaped by cold compression and is then sintered under a dry hydrogen atmosphere to simultaneously reduce the oxide or oxygenated compound into metal.

18. The process according to claim 17, wherein the metal is able to form an oxide having an oxygen potential defined by the formula:

$$\Delta G(O_2) = RTLn(pO_2)$$

in which R is the molar constant of the gases, T is the nuclear reactor temperature in Kelvins and $pO_2$ is the partial oxygen pressure equal to or below:

$$360\ 000 + 214\ T + 4\ RTLn\ (2x(1-2x)/(1-4x)^2]$$

in which R and T have the meanings given hereinbefore and x is such that $0<x\leq0.01$.

19. The process according to claim 17, wherein the metal is able to form an oxide having an oxygen potential defined by the formula:

$$\Delta G(O_2) = RTLn(pO_2)$$

in which R is the molar constant of the gases, T is the nuclear reactor temperature in Kelvins and $pO_2$ is the partial oxygen pressure equal to or below:

$$360\ 000 + 214\ T + 4\ RTLn\ (2x(1-2x)/(1-4x)^2]$$

in which R and T have the meanings given hereinbefore and x is such that $0<x\leq0.01$.

20. The process according to claim 17, wherein the metal is chosen from the group consisting of Cr, Mo, Ti, Nb and U.

21. The process according to claim 20, wherein the metal is Cr and the Cr. content of the fuel material is 0.1 to 1% by weight.

22. The process according to claim 21, wherein the chromium content is 0.2 to 0.5% by weight.

23. The process according to claim 17, wherein the ceramic material powder is a $UO_2$ powder.

24. The process according to claim 23, wherein the sintering takes place at a temperature of 600 to 1750° C.

25. The process according to claim 17, wherein the oxygenated compound of the metal is an ammonium chromate or an ammonium heptamolybdate.

* * * * *